Patented July 2, 1935

2,006,756

UNITED STATES PATENT OFFICE 2,006,756

LIQUID FUEL COMPOSITION

Thomas W. Bartram, Nitro, W. Va., assignor to The Rubber Service Laboratories Company, Akron, Ohio, a corporation of Ohio No Drawing. Application April 4, 1932, Serial No. 603,231

7 Claims. (Cl. 44—9)

The present invention relates to a composition of matter comprising oil products of different types for use as liquid fuels in internal combustion engines, as lubricating oils, as transformer oils, as a circulating medium in oil heating systems, and the like.

One object of the present invention is to provide a new treated oil composition possessing desirable stabilizing means.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactorily stable mineral oil product be employed.

It is well known that combustible liquids derived from mineral oils before the usual refining processes, frequently and in some cases invariably, contain a proportion of ingredients which give rise to resin formation. This is particularly the case with various fractions of oils produced by different refining and treating means from various crude oils. Immediately and for a short time after distillation, such unrefined motor fuel, for example cracked gasoline, may be comparatively free from non-volatile resinous matter, but on storage or when used in internal combustion engines give rise to resinous material. The resinous material on storage may either remain dissolved in the liquid, or in certain cases be partially separated.

A further object of the present invention is to substantially prevent or greatly reduce the resin formation in such liquids, thus rendering it possible to store them for substantially long periods of time without deterioration and to use them satisfactorily as fuels in internal combustion engines, thus avoiding or considerably reducing refining losses.

It has been recognized that if the above mentioned fuels could be treated in some manner which would prevent resin formation, there would be a great advantage in using such fuel which has been refined as little as possible in view of the economy of utilizing the whole of the unsaturated constituents and also for the reason that these constituents possess valuable anti-knock properties.

According to the present invention, a new oil composition has been developed which possesses particularly desirable characteristics and which is resistant to the formation of gummy and resinous deposits. More particularly, the present invention relates to the incorporation in a mineral oil or a fraction, cut or product derived therefrom, of a suitable material which markedly inhibits the formation of resin, gum and like deposits.

The class of materials which have been found to possess the desirable qualities set forth in that small proportions thereof when incorporated in a relatively unstable oil product, for example, gasoline materially increases the stability thereof, comprise sulfurized amines, or more particularly the reaction product of amines with sulfur or compounds containing readily reactive sulfur.

In order to test the gum inhibiting properties of the preferred class of materials the following procedure which is essentially that described by E. B. Hunn, H. G. M. Fischer and A. J. Blackwood in the Society of Automotive Engineers Journal, Vol. 26, #1 (1930), pages 32 and 33, was employed.

Into an Emerson coal calorimeter bomb having a capacity of 500 cc., a small glass open vessel having a capacity of substantially 150 cc., was placed, which contained 100 cc. of an unstable gasoline, such as, for example, a gasoline known as "cracking coil distillate", to which had been added a small proportion of one of the preferred class of materials which may be called "gum inhibitors". The lid was then placed tightly on the bomb. Substantially one hundred pounds pressure of oxygen was then introduced by means of a delivery tube, after which said delivery tube was closed by means of a suitable valve. The bomb was then connected by means of a delivery tube with a pressure gauge having a range between 0 to 200# and having an accurate scale from 100–150#, after which it was heated preferably by immersing it in a hot water bath maintained at 95° to 98° C. and maintained at said temperature so long as there was no appreciable drop in pressure as indicated by the pressure gauge. A drop in pressure indicates a reaction between the oxygen and the unstable portion of the gasoline. The period of time elapsing before this reaction takes place is indicative of the stability of the gasoline. For the special type of gasoline mentioned, that is the gasoline known as "cracking coil distillate", the period of stability as hereinafter employed is the time in minutes from the time of the immersion of the bomb in the bath maintained at a temperature of 97–98° C. until there is a drop in pressure on the pressure gauge of 5 pounds per square inch.

As one method of operating the present invention, one of the preferred materials, for example, 30 mg. of sulfurized diphenylamine, known as thio diphenylamine possessing a structural formula of

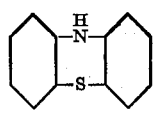

was dissolved in 100 cc. of unstable gasoline known as "cracking coil distillate" and a test carried out in the Emerson bomb in the manner described. The period of stability, or in other words the period of time from the immersion of the bomb in the liquid bath maintained at 97–98° B. until a decrease of 5 pounds per square inch was indicated on the pressure gauge was 780 minutes.

A test carried out in a manner identical with that given above, with the exception that no "gum inhibitor" was added, had a period of stability of 40 minutes.

If convenient or desirable, if the inhibitor to be added to the unstable oil product, for example gasoline, is not readily soluble therein, it may be dissolved in a solvent, for example isopropyl alcohol, benzol and the like, fully miscible with said unstable gasoline, and the solution of the inhibitor thus prepared added thereto.

Further examples of the preferred class of sulfurized amines that have been incorporated in an unstable gasoline, as for example "cracking coil distillate" and found to inhibit the gum formation therein comprise the following: thiophenyl beta naphthyl amine possessing a structural formula of

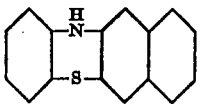

thio di beta naphthyl amine possessing a structural formula of

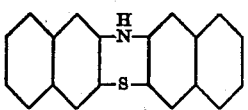

reaction product of substantially two atomic weight portions of sulfur and substantially one molecular proportion of p, p' dioxy diphenylamine, said reaction product is believed to possess the structural formula of

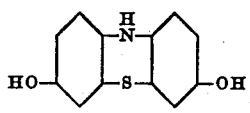

and others, particularly sulfurized aryl secondary amines.

The results obtained on testing the stabilizing action of the above materials in the manner hereinbefore set forth when incorporated in unstable gasoline known as "cracking coil distillate" are given in the following table.

Table I

| Gum inhibitor | Wt. of gum inhibitor added m. g. | c. c. of "cracking coil distillate" | Period of stability before pressure dropped five pounds per sq. in. |
|---|---|---|---|
| Thio phenyl beta naphthylamine | 30 | 100 | 175 |
| Thio di beta naphthylamine | 30 | 100 | 110 |
| Reaction product of sulfur and p, p' dioxy diphenylamine | 30 | 100 | 65 |
| None | None | 100 | 40 |

Other examples of the preferred class of materials that have been employed as stabilizers of unstable gasoline and the like and found to possess the characteristics of the class comprise thio dimethyl aniline possessing the structural formula of

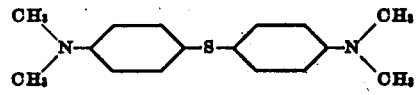

reaction product of substantially one molecular proportion of acetone-alpha naphthylamine reaction product with substantially one atomic weight portion of sulfur, reaction product of substantially two molecular proportions of acetone-aniline reaction product with substantially one molecular proportion of sulfur mono chloride, reaction product of substantially equimolecular proportions of aldol alpha naphthylamine and sulfur mono chloride, and methylene blue having the structural formula

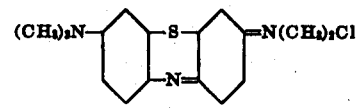

Other similar oil compositions designed for particular uses may be prepared in the manner described by merely substituting the desired oil fraction or cut and adding the necessary quantity of the gum inhibitor thereto. To produce the effect desired, a quantity of inhibitor equal to from approximately 0.001 to 0.05% of the weight of the oil is preferably employed.

Other ratios of the preferred class of materials than those hereinbefore set forth have been incorporated in an unstable oil product, for example gasoline. Further, other methods of testing the preferred class of materials than those hereinbefore set forth may be employed.

The present invention is limited solely by the claims attached hereto as part of the present specification.

What is claimed is:

1. A cracked hydrocarbon motor fuel of the type which tends to deteriorate on storage as evidenced by color and gum formation containing as a stabilizer thereof a small quantity of a thio diaryl amine.

2. A cracked hydrocarbon motor fuel of the type which tends to deteriorate on storage as evidenced by color and gum formation containing as a stabilizer thereof a small quantity of a compound possessing the structural formula of

wherein R is an aromatic radical.

3. A cracked hydrocarbon motor fuel of the type which tends to deteriorate on storage as evidenced by color and gum formation containing as a stabilizer thereof a small quantity of a compound possessing the structural formula of

wherein R is an aromatic hydrocarbon radical.

4. Gasoline produced by the cracking of petroleum oils containing as a stabilizer thereof a small quantity of a thio diaryl amine.

5. Gasoline produced by the cracking of petroleum oils containing as a stabilizer thereof a small quantity of a compound possessing the structural formula

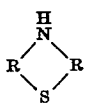

wherein R is an aromatic radical.

6. Gasoline produced by the cracking of petroleum oils containing as a stabilizer thereof a small quantity of a compound possessing the structural formula

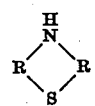

wherein R is an aromatic hydrocarbon radical.

7. Gasoline produced by the cracking of petroleum oils containing as a gum inhibitor a small amount of thiodiphenylamine.

THOMAS W. BARTRAM.